United States Patent [19]

Kawamura et al.

[11] Patent Number: 4,833,237

[45] Date of Patent: May 23, 1989

[54] PROCESS FOR PRODUCING GRANULAR POROUS CHITOSAN

[75] Inventors: Yoshihide Kawamura; Hiroaki Tanibe; Itsuo Kurahashi, all of Shizuoka; Hiroshi Seo, Souka; Saburo Nakajima, Koshigaya, all of Japan

[73] Assignee: Fuji Spinning Co., Ltd., Tokyo, Japan

[21] Appl. No.: 11,150

[22] Filed: Feb. 5, 1987

[51] Int. Cl.$^4$ ............................................. C08B 37/08
[52] U.S. Cl. .................................. 536/20; 536/55.3; 536/124
[58] Field of Search .......................... 536/20, 55.3, 124

[56] References Cited

U.S. PATENT DOCUMENTS

| | | | |
|---|---|---|---|
| 2,040,880 | 5/1936 | Rigby | 536/20 |
| 3,879,376 | 4/1975 | Vanlerberghe et al. | 536/20 |
| 4,308,377 | 12/1981 | Koshugi | 536/20 |
| 4,336,070 | 6/1982 | Koshugi | 536/20 |
| 4,376,199 | 3/1983 | Koshugi | 536/20 |
| 4,532,321 | 7/1985 | Castle et al. | 536/20 |
| 4,574,150 | 3/1986 | Austin | 536/20 |
| 4,619,995 | 10/1986 | Hayes | 536/20 |
| 4,659,390 | 4/1987 | Zeller et al. | 536/124 |
| 4,659,700 | 4/1987 | Jackson | 536/20 |

FOREIGN PATENT DOCUMENTS

| | | | |
|---|---|---|---|
| 0026618 | 8/1981 | European Pat. Off. | 536/20 |
| 57-11258 | 1/1982 | Japan | 536/20 |
| 58-29801 | 2/1983 | Japan | 536/20 |
| 58-57401 | 4/1983 | Japan | 536/20 |
| 60-186504 | 9/1985 | Japan | 536/20 |
| 61-40303 | 2/1986 | Japan | 536/20 |

*Primary Examiner*—Ronald W. Griffin
*Assistant Examiner*—Nancy S. Carson
*Attorney, Agent, or Firm*—Spensley Horn Jubas & Lubitz

[57] ABSTRACT

A process for producing granular porous chitosan of extremely uniform particle size and having uniform fine pores on the spherical surface and cut cross sectional face. The process comprises dissolving a low molecular weight chitosan into an aqueous acidic solution, pouring the solution into a basic solution and thereby coagulating the product to precipitate porous chitosan.

11 Claims, No Drawings

PROCESS FOR PRODUCING GRANULAR POROUS CHITOSAN

FIELD OF THE INVENTION AND RELATED ART STATEMENT

This invention concerns a process for producing granular porous chitosan which is extremely suitable as filler for chromatography, carrier for immobilized enzymes or the like.

Chitosan is available from chitin as a constituent materials of the outer shells of Crustacea such as lobsters and crabs but it is difficult to handle when dissolved in a solvent, because the viscosity of the solution becomes extremely high like that of a gelified state even at a concentration as low as several % due to the strong hydrogen bond between molecules.

Processes as disclosed in Japanese Patent Laid-Open Nos. 167048/1980, 16532/1981 and 57401/1983 have been known for production of granular chitosan. Japanese Patent Laid-Open No. 167048/1980 concerns a process for producing spherical chitin, wherein an aqueous solution of a de-N-acetylation product of chitin optionally containing a suspending agent is added and dispersed into a dispersion bath containing a suspending agent to apply granulating and acylating treatment and, if required, crosslinking treatment is further applied with an epoxy type crosslinker such as epichlorohydrin. However, this process requires complicated procedures for obtaining desired particle size and porosity because the suspending agent is used for sphericalizing the starting material and a viscosity reducer is added is view of the difficulty in obtaining a spherical product of small size or porous structure due to the high viscosity of the solution even at a low concentration. In the method disclosed in Japanese Patent Laid-Open No. 16532/1981, a liquid mixture obtained by adding a diluent, pore regulator and surface active agent to an aqueous solution of a soluble chitin derivative is treated with an acylating agent containing a surface active agent and, if required, a crosslinking treatment using an epoxy type crosslinker such as epichlorohydrin. Also in this method, various kinds of additives have to be added in order to obtain porous spherical material from the solution at a low concentration in the same manner as described above. Furthermore, the process disclosed in Japanese Patent Laid-Open No. 57401/1983 comprises adding a hydrophobic solvent containing an emulsifier to an aqueous acidic solution of chitosan, sufficiently stirring to form an emulsion, pouring the emulsion in an aqueous alkali solution under stirring and coagulating to deposit fine powderous chitosan. Although a hydrophobic solvent containing an excess emulsifier is added to the aqueous acidic solution of chitosan for reducing the viscosity of the aqueous solution of high molecular weight chitosan, the concentration of chitosan is within a range as low as from 0.5 to 3.0%.

Since high molecular weight chitosan is used in any of the above-described known processes, when chitosan is dissolved into a solvent such as acetic acid or formic acid, the viscosity of the solution becomes extremely high to reach the gelified state even at a concentration as low as several % due to the nature of the chitosan. Accordingly, chitosan has to be dispersed to a considerable degree to avoid a gelified state and to obtain granular material and, for this purpose, a chitosan solution at a low concentration is prepared by dispersing chitosan using a suspending agent, pore regulator, emulsifier, surface active agent or the like. However, the use of such additives results in drawbacks, in that the particle size and the porous state of the thus obtained porous spherical material are changed depending on the difference in the ratio of the chemicals used. This results in difficulty in obtaining product of uniform properties; moreover, the granular material thus obtained lacks strength.

On the other hand, granular porous chitosan is defective in that it is dissolved and loses its porous structure due to the property of chitosan itself when used in an aqueous acidic solution. In order to eliminate the foregoing defect, there has been known a process of crosslinking by the use of a crosslinker such as epichrolohydrin and glutaraldehyde as described in the above known method, or a process of crosslinking through contact with cyanurchloride as disclosed in Japanese Patent Publication No. 55460/1982. However, even the products thus treated have a drawback in that they require a degassing and they lose porosity when they are subjected to freeze-drying or ordinary drying and then immersed in an aqueous system again.

OBJECT AND SUMMARY OF THE INVENTION

The object of this invention is to obtain a granular porous chitosan with an uniform particle size and having uniform fine pores not only at a spherical surface but also in a cut cross sectional face by using a low molecular weight chitosan, and furthermore, to obtain granular porous chitosan capable of recovering fine pores when it is immersed again in the aqueous system after drying treatment.

In accordance with this invention, granular porous chitosan of extremely uniform particle size and having uniform fine pores on the spherical surface and a cut cross sectional face is formed by preparing a chitosan solution at a high concentration by the use of a low molecular weight chitosan, pouring the solution into a basic solution, coagulating the same, and then crosslinking the same using an organic diisocyanate compound. A granular porous chitosan having improved resistance to acid and alkali, and capable of recovering such a fine porosity, when the above-prepared chitosan is once subjected to freeze drying or ordinary drying and then immersed in water, as that possessed by the granular porous chitosan before drying treatment, is prepared.

Further in accordance with this invention, the low molecular weight chitosan is dissolved in an aqueous solution of acetic acid, dichloroacetic acid or formic acid solely or as a mixture, the solution poured into a basic solution and coagulated to precipitate granular porous chitosan to thereby obtain a granular porous chitosan, which is further crosslinked with an organic diisocyanate compound.

DETAILED DESCRIPTION OF THE INVENTION

In this invention, a low molecular weight chitosan having an average molecular weight between 10,000 and 230,000 is used. Flake-like high molecular weight chitosan is used after being reduced to a desired molecular weight. The present inventors have made an earnest study for the process of producing a low molecular weight chitosan and have invented a process for preparing a chitosan at a good quality having a desired molecular weight by applying heating treatment to chitosan in an aqueous solution of sodium perborate. While the low molecular weight chitosan obtained by this method can suitably be used in the process according to this invention, those chitosans obtained by other processes may also be used in this invention so long as they have a molecular weight in the above-mentioned range. The low molecular weight chitosan is used by being dissolved into the aqueous solution of the acid as described above. The concentration of the solution can freely be selected depending on the molecular weight of chitosan, from a range where it has a flowability and can easily be handled. The most preferred concentration of the solution is in the range from 2% to 20%. Further, a viscosity regulator such as urea may be added to the acidic aqueous solution as required within a range from 0 to 5%.

The aqueous acidic solution of chitosan prepared as described above, is poured in a predetermined amount into a coagulating bath through a discharge hole of 0.1–0.25 mm aperture size under pressure. In this case, the pore diameter of the discharge port, pressure or the like may of course be selected optionally depending on the desired particle size. As the coagulating bath, a basic solution may be used. Basic material usable herein can include alkali material such as sodium hydroxide, potassium hydroxide, sodium carbonate, potassium carbonate, ammonia and ethylene diamine. The basic solution used is prepared by adding the above-mentioned basic material to water, and alcohol having polarity such as methanol and ethanol or a mixture of water and alcohol. Since the alcohol serves to reduce the surface tension of the coagulating bath, it can moderate the shocks upon pouring and thus easily control the specific surface area. The concentration of the basic solution can optionally be selected depending on the concentration of the aqueous acidic solution of chitosan employed or on the natures of the desired granular porous chitosan.

Chitosan forms finely porous structure while settling in the coagulating bath in the form of granules with the advance of the desolvent reaction. Then, settled spherical coagulation products are taken out, neutralized by water washing and dried as required to obtain granular porous chitosan.

Explanation will then be made for the process of producing granular porous chitosan capable of recovering fine porosity after the drying, by further applying crosslinking treatment to the granular porous chitosan obtained as described above.

Spherical coagulants settled in the coagulating bath as described above are taken out, neutralized with water washing, and then water used for the water washing is completely eliminated by the use of a polar solvent. In this case, it is of course desirable for promoting the treatment to previously apply vacuum filtration to the spherical coagulants to remove water.

Then, crosslinking treatment is applied to the spherical coagulants of chitosan in a solution of an organic diisocyanate compound dissolved in a polar solvent which is identical with or different from the polar solvent used for water replacement. After the crosslinking has been conducted sufficiently, the unreacted organic diisocyanate compound is sufficiently washed to eliminate it be using the same polar solvent as that employed for the reaction, followed by sufficient water washing to obtain granular porous chitosan subjected to crosslinking treatment.

The polar solvent usable in this invention can include alcohols such as methanol, ethanol and isopropanol; ketones such as acetone and methyl ethyl ketone; and amides such as dimethylformamide and dimethylacetoamide. These polar solvents may be used alone or in admixture of two or more of them.

As the organic diisocyanate compound used for the crosslinking reaction, those aliphatic, cycloaliphatic and aromatic diisocyanates that are dissolved in a polar solvent under the reaction condition can be used. Such organic diisocyanate can include, for example, 4,4'-diphenylmethane diisocyanate, 1,4-phenylene diisocyanate, 2,4-tolylene diisocyanate, naphthalene diisocyanate, 1,4-cyclohexane diisocyanate, 4,4'-dicyclohexylmethane diisocyanate, xylylene diisocyanate, isophorone diisocyanate and hexamethylene diisocyanate.

There are no particular restrictions to the concentration of the organic diisocyanate compound used in this invention. However, if the molar ratio of the organic diisocyanate compound per one mole of the glucosamine residue of chitosan is extremely low, although the granular porous chitosan thus prepared is insoluble to acid it can not sufficiently withstand conditions such as concentration. On the other hand, if the molar ratio is too high, although the acid resistance and porosity can sufficiently be retained, water washing for the residual organic diisocyanate compound is rather complicated undesirably. In view of the above, the concentration of the organic diisocyanate compound is preferably within a range from 0.2 to 2.0 mol per one mol of the glucosamine residue of chitosan. Referring to the polar solvent for reaction to crosslink the chitosan with the organic diisocyanate compound, it is preferred to use 2 volumes of the polar solvent containing the organic diisocyanate compound within the above-specified molar range per one volume of chitosan in admixture. While the reaction conditions for the crosslinking may properly be selected depending on the organic diisocyanate compound employed, the reaction can be attained by reacting them at a temperature below the boiling point of the polar solvent used for a period from 30 min. to 24 hours under stirring.

EXAMPLE

This invention will now be described more specifically referring to examples but it should be noted that this invention is no way limited to the numerical values as described therein.

The molecular weight of chitosan was measured by its viscosity. That is, since direct measurement for the molecular weight requires complicated procedures, the molecular weight is determined by measuring the viscosity using a rotary type viscometer, calculating the degree of polymerization in accordance with the Staudinger's viscosity equation from the viscosity measured at a stable 20° C. temperature while using the correlation between the viscosity and the molecular weight, and multiplying the calculated value with the molecular weight of chitosan unit. The viscosity of the aqueous acidic solution of the chitosan was also measured by using the above-mentioned viscometer. The specific surface area of the granular porous chitosan was measured by way of a BET method using an automatic specific surface area measuring device (Shimazu Micromeritix Model 2200) after freezing the sample in liquid nitrogen, and freeze drying the sample under $10^{-4}$ Torr, at $-40°$ C. for 8 hours and then degasing at 140° C. for 40 minutes. The pore diameter was determined by taking a scanning electron microscopic photograph at 2000× of a sliced cross section of a sample which had been a vacuum dried sample used in the measurement of the specific surface area; the surface was deposited with gold, and the pore diameter measured by using a stereo scopic microscope incorporated with a micrometer at 30× for 10 views.

The bed volume recovery rate was determined according to the following equation while assuming the bed volume in the undried state as 1 and determining the volume when the porosity was recovered after the sample has been dried at 50° C. and left for 12 hours in an aqueous system:

$$\text{Bed volume recovery rate} = \frac{\text{Volume after left in the aqueous system after drying}}{\text{Volume in the not-dried state}} \times 100(\%)$$

The following examples are included merely to aid in the understanding of the invention, and variations may be made by one skilled in the art without departing from the spirit and scope of the invention.

EXAMPLE 1

Formic acid and water were used as the solvent and, so that the viscosity of the acidic solution of chitosan was 2800 centipoise (cp), the concentration of chitosan was set respectively to 2% in the case of the average molecular weight of chitosan of 200,000 to 4% in the case of average molecular weight of 81,000, to 6% in the case of average molecular weight of 46,000, to 10% in the case of average molecular weight of 15,000 and to 14% and 20% in the case of average molecular weight of 11,000. In order to obtain granular porous chitosan of 1.8 mm particle size, these solvents are poured, depending on the chitosan concentration, through a nozzle of 0.15 mm diameter under $N_2$ gas pressure of 2 kg/cm$^2$ for the chitosan concentration of 2%, 4% and 6%, and through a nozzle of 0.24 mm diameter under $N_2$ gas pressure of 2 kg/cm$^2$ for the chitosan concentration of 10%, 14%, 20% into respective aqueous basic solutions in the combination of 2%, 10% and 30% of NaOH with 5%, 50% and 60% of methanol and water to obtain chitosan of desired particle diameters. They were washed with water and the pore size and specific surface area were measured and the results are shown in Table 1—1 and 1—2. Further, chitosan of average molecular weight of 23,000 was used in order to obtain 4,000 cp viscosity of the aqueous acidic solution of chitosan and the same granulation as in the case of 10% chitosan concentration described above was carried and the results are shown in Table 2.

TABLE 1-1

| Chitosan concentration (%) | NaOH (%) | CH$_3$OH (%) | | | | | |
|---|---|---|---|---|---|---|---|
| | | 5 | | 50 | | 60 | |
| | | Pore diameter (μm) | Specific surface area (m$^2$/g) | Pore diameter (μm) | Specific surface area (m$^2$/g) | Pore diameter (μm) | Specific surface area (m$^2$/g) |
| 2 | 2 | 0.6 | 79.3 | 0.6 | 78.2 | 0.6 | 76.5 |
| | 10 | 0.6 | 80.8 | 0.6 | 80.1 | 0.6 | 79.4 |
| | 30 | 0.6 | 82.4 | 0.6 | 82.0 | 0.6 | 81.5 |
| 4 | 2 | 0.5 | 75.5 | 0.5 | 75.8 | 0.5 | 72.2 |
| | 10 | 0.5 | 75.0 | 0.5 | 76.2 | 0.5 | 76.3 |
| | 30 | 0.5 | 74.5 | 0.5 | 77.3 | 0.5 | 78.1 |
| 6 | 2 | 0.4 | 70.2 | 0.4 | 41.2 | 0.4 | 58.7 |
| | 10 | 0.4 | 77.1 | 0.4 | 76.5 | 0.4 | 68.8 |
| | 30 | 0.4 | 77.0 | 0.4 | 76.2 | 0.4 | 68.9 |

TABLE 1-2

| Chitosan concentration (%) | NaOH (%) | CH$_3$OH (%) | | | | | |
|---|---|---|---|---|---|---|---|
| | | 5 | | 50 | | 60 | |
| | | Pore diameter (μm) | Specific surface area (m$^2$/g) | Pore diameter (μm) | Specific surface area (m$^2$/g) | Pore diameter (μm) | Specific surface area (m$^2$/g) |
| 10 | 2 | 0.3 | 62.1 | 0.3 | 39.5 | 0.3 | 46.4 |
| | 10 | 0.3 | 77.8 | 0.3 | 76.6 | 0.3 | 52.9 |
| | 30 | 0.3 | 76.7 | 0.3 | 77.3 | 0.3 | 56.2 |
| 14 | 2 | 0.25 | 54.5 | 0.25 | 73.1 | 0.25 | 29.2 |
| | 10 | 0.25 | 76.3 | 0.25 | 76.6 | 0.25 | 31.8 |
| | 30 | 0.25 | 74.3 | 0.25 | 75.4 | 0.25 | 32.6 |
| 20 | 2 | 0.2 | 32.3 | 0.2 | 21.8 | 0.2 | 14.3 |
| | 10 | 0.2 | 57.1 | 0.2 | 34.9 | 0.2 | 16.7 |
| | 30 | 0.2 | 68.5 | 0.2 | 46.7 | 0.2 | 18.6 |

TABLE 2

| Chitosan concentration (%) | NaOH (%) | CH$_3$OH (%) | | | | | |
|---|---|---|---|---|---|---|---|
| | | | | 50 | | 60 | |
| | | Pore diameter (μm) | Specific surface area (m$^2$/g) | Pore diameter (μm) | Specific surface area (m$^2$/g) | Pore diameter (μm) | Specific surface area (m$^2$/g) |
| 10 | 2 | 0.3 | 60.5 | 0.3 | 37.8 | 0.3 | 38.1 |
| | 10 | 0.3 | 74.3 | 0.3 | 74.8 | 0.3 | 47.9 |
| | 30 | 0.3 | 75.6 | 0.3 | 73.7 | 0.3 | 49.0 |

Then, the particle size distribution of the granular porous chitosan obtained according to this invention was measured. The particle size distribution for 250 pieces of granular porous chitosan obtained from acidic solution of chitosan at 14% concentration by using a coagulating bath of 30% NaOH, 5% $CH_3OH$ and 65% $H_2O$ system was as shown in Table 3-1 and the average particle size was 1.77 mm. Further, the particle size distribution for 1271 pieces of the granular porous chitosan obtained from the acidic solution of the chitosan at 4.5% concentration and at 2800 cp viscosity by using a coagulating bath of 5% NaOH, 40% $C_2H_5OH$ and 55% $H_2O$ system was as shown in Table 3-2 and the average particle size was 0.45 mm.

the solution was 2800 cp, by setting the chitosan concentration to 4% in the case of the average molecular weight of chitosan of 81,000, to 6% in the case of average molecular weight of 46,000 and to 12% in the case of average molecular weight of 11,000 respectively. $NaOH + H_2O$ system, ethylenediamine $+ CH_3OH$ system, $NH_3 + H_2O$ system and $NH_3 + CH_3OH + H_2O$ system (aqueus 25% ammonia+methanol system) were used as the basic solution and, while varying the concentration for the respective systems, acidic solutions of chitosan were poured in the same procedures as in Example 1 to the coagulating bases to obtain the granular porous chitosan. The results for measuring the pore diameter and the specific surface area of the thus obtained granular porous chitosan are shown in Tables 4-1, 4-2, 4-3 and 4-4.

TABLE 3-1

| | Particle size (x mm) | | | | | |
|---|---|---|---|---|---|---|
| | x < 1.6 | 1.6 ≦ x < 1.7 | 1.7 ≦ x < 1.8 | 1.8 ≦ x < 1.9 | 1.9 ≦ x < 2.0 | 2.0 ≦ x |
| Number of particles | 0 | 8 | 123 | 112 | 7 | 0 |
| Percentage (%) | 0 | 3.2 | 49.2 | 44.8 | 2.8 | 0 |

TABLE 3-2

| | Particle size (x mm) | | | | | | | |
|---|---|---|---|---|---|---|---|---|
| | x < 0.1 | 0.1 ≦ x < 0.2 | 0.2 ≦ x < 0.3 | 0.3 ≦ x < 0.4 | 0.4 ≦ x < 0.5 | 0.5 ≦ x < 0.6 | 0.6 ≦ x < 0.7 | 0.7 ≦ x |
| Number of particles | 21 | 47 | 56 | 189 | 710 | 160 | 58 | 0 |
| Percentage (%) | 1.7 | 3.7 | 6.8 | 15.0 | 56.2 | 12.7 | 4.0 | 0 |

EXAMPLE 2

By using dichloroacetic acid and water, acidic solutions of chitosan were prepared so that the viscosity of

TABLE 4-1

| | $NaOH/H_2O$ (%/%) | | | | | |
|---|---|---|---|---|---|---|
| | 2/98 | | 20/80 | | 40/60 | |
| Chitosan concentration (%) | Pore diameter (μm) | Specific surface area ($m^2/g$) | Pore diameter (μm) | Specific surface area ($m^2/g$) | Pore diameter (μm) | Specific surface area ($m^2/g$) |
| 4 | 1.6 | 71.8 | 1.4 | 82.6 | 1.0 | 98.3 |
| 6 | 1.6 | 67.8 | 1.4 | 80.7 | 1.1 | 87.9 |
| 12 | 1.5 | 58.5 | 1.8 | 72.7 | 1.2 | 80.8 |

TABLE 4-2

| | Ethylenediamine $CH_3OH$ (%/%) | | | | | |
|---|---|---|---|---|---|---|
| | 1/99 | | 5/95 | | 20/80 | |
| Chitosan concentration (%) | Pore diameter (μm) | Specific surface area ($m^2/g$) | Pore diameter (μm) | Specific surface area ($m^2/g$) | Pore diameter (μm) | Specific surface area ($m^2/g$) |
| 4 | 0.4 | 88.6 | 0.5 | 40.7 | 2.5 | 20.4 |
| 6 | 0.4 | 71.6 | 0.5 | 34.8 | 2.5 | 18.9 |
| 12 | 0.25 | 89.4 | 0.5 | 31.8 | 2.5 | 15.7 |

TABLE 4-3

| | $NH_3/H_2O$ (%/%) | | | | | |
|---|---|---|---|---|---|---|
| | 1/99 | | 2.5/97.5 | | 10/90 | |
| Chitosan concentration (%) | Pore diameter (μm) | Specific surface area ($m^2/g$) | Pore diameter (μm) | Specific surface area ($m^2/g$) | Pore diameter (μm) | Specific surface area ($m^2/g$) |
| 4 | 2.9 | 38.1 | 2.8 | 38.5 | 2.8 | 45.6 |
| 6 | 2.9 | 31.5 | 2.8 | 32.8 | 2.7 | 36.0 |
| 12 | 1.9 | 27.2 | 1.7 | 31.9 | 1.4 | 43.1 |

TABLE 4-4

| Chitosan concentration (%) | Aqueous 25% Ammonia CH₃OH (%/%) | | | | | |
|---|---|---|---|---|---|---|
| | 4/96 | | 10/90 | | 40/60 | |
| | Pore diameter (μm) | Specific surface area (m²/g) | Pore diameter (μm) | Specific surface area (m²/g) | Pore diameter (μm) | Specific surface area (m²/g) |
| 4 | 3.1 | 40.8 | 3.0 | 40.6 | 3.0 | 42.9 |
| 6 | 1.9 | 42.6 | 2.8 | 38.1 | 2.5 | 41.8 |
| 12 | 0.8 | 74.1 | 0.7 | 70.8 | 1.3 | 41.3 |

As described in Examples 1 and 2 above, the granular porous chitosan obtained according to the process of this invention is in a granular spherical shape of a substantially true sphere and the particle size distribution is concentrated to an extremely narrow range. Upon observing the surface and the sliced cross sectional face of the spherical granular chitosan by using a scanning electron microscope, it is conformed that the spherical granular chitosan in the examples has a pore diameter from 0.2–0.3 μm and uniform fine pores at the spherical surface with a specific surface area of from 15 to 90m²/g and the sliced cross sectional face. For instance, if a granule is considered as the true sphere of 1.8 mm in diameter, its surface area is about 0.003 m²/g and, accordingly, the granular porous chitosan according to this invention have a surface area 5,000–30,000 time as large as this, which demonstrates the formation of the fine pores.

EXAMPLE 3

70 g of chitosan with deacetylation degree of 80% and having average molecular weight of 46,000 were dissolved in 930 g of water containing 35 g of acetic acid to prepare a solution of 2500 cp viscosity. The solution was poured through a nozzle of 0.25 mm into a basic solution comprising 10% sodium hydroxide, 50% methanol and 40% water so as to form a spherical configuration and coagulated to precipitate, which was then sufficiently washed with water for neutralization to obtain granular porous chitosan of from 20 to 30 mesh and 89.4 m²/g of specific surface area.

After applying vacuum filtration to 50 ml of water-containing granular porous chitosan (volume as settled, dry weight 3.18 g) to remove water contained therein, they were placed in 100 ml of acetone as a polar solvent to completely eliminate the water content with acetone by repeatingly applying water replacing procedures under stirring. The granular porous chitosan with the water content completely eliminated was placed in a solvent containing hexamethylene diisocyanate in an amount 0.2, 0.3, 0.5, 1.0, 1.5 and 2.0 mol respectively per one mol of the glucosamine residue of chitosan employed in 100 ml of acetone and then reacted at 30° C. for 1.5 hours under sufficient stirring. The same procedures were also repeated for xylylene diisocyanate and 4,4′-diphenylmethane diisocyanate. After the completion of the respective reactions, unreacted organic diisocyanate compounds were sufficiently removed with acetone and the product further washed sufficiently with water to obtain granular porous chitosan.

The specific surface area, the bed volume recovery rate and the amount of the organic diisocyanate reacted were respectively measured for the case of drying the thus obtained granular porous chitosan at 50° C. and then immersing again in the aqueous system, and for the case where the granular porous chitosan before the reaction with the organic diisocyanate compound was dried at 50° C. and then immersed again in the water and the results are shown in Table 5. The specific surface areas indicated by 1 – 4 in the below specific from Tables 5 to 11 represent the specific surface area (m²/g) when applied with the following treatments.

Specific surface area 1 —For the granular porous chitosan in a moistened state before reaction with the organic diisocyanate compound.

Specific surface area 2 —The value in the case where the granular porous chitosan before reaction with the organic diisocyanate compound was immersed in the aqueous system after drying.

Specific surface area 3 —For the granular porous chitosan in a moistened state after reaction with the organic diisocyanate compound.

Specific surface area 4 —The value in the case where the granular porous chitosan after reaction with the organic diisocyanate compound was dried and then immersed in the aqueous system.

TABLE 5

| Cross-linker | Mol number of cross-linker | Specific surface area (m²/g) | | | | Bed volume recovery rate (%) | |
|---|---|---|---|---|---|---|---|
| | | 1 | 2 | 3 | 4 | Before cross-linking | After cross-linking |
| Mexamethylene diisocyanate (HDI) | 0.2 | 89.4 | less than 0.01 | 72.8 | 70.1 | 23 | 69 |
| | 0.3 | 89.4 | less than 0.01 | 96.3 | 78.2 | 23 | 68 |
| | 0.5 | 89.4 | less than 0.01 | 79.8 | 95.0 | 23 | 83 |
| | 1.0 | 89.4 | less than 0.01 | 117.8 | 88.5 | 23 | 91 |
| | 1.5 | 89.4 | less than 0.01 | 166.7 | 158.1 | 23 | 98 |
| | 2.0 | 89.4 | less than 0.01 | 119.9 | 120.1 | 23 | 83 |
| Xylylenediisocyanate (XDI) | 0.2 | 89.4 | less than 0.01 | 138.6 | 109.7 | 23 | 72 |
| | 0.3 | 89.4 | less than 0.01 | 145.1 | 114.1 | 23 | 72 |
| | 0.5 | 89.4 | less than 0.01 | 152.3 | 129.5 | 23 | 81 |
| | 1.0 | 89.4 | less than 0.01 | 158.4 | 132.4 | 23 | 83 |
| | 1.5 | 89.4 | less than 0.01 | 162.1 | 135.5 | 23 | 96 |
| | 2.0 | 89.4 | less than 0.01 | 126.3 | 100.6 | 23 | 87 |
| 4,4′-diphenylmethane diisocyanate (MDI) | 0.2 | 89.4 | less than 0.01 | 80.7 | 78.6 | 23 | 74 |
| | 0.3 | 89.4 | less than 0.01 | 130.6 | 120.3 | 23 | 76 |
| | 0.5 | 89.4 | less than 0.01 | 156.2 | 132.5 | 23 | 81 |
| | 1.0 | 89.4 | less than 0.01 | 161.0 | 139.1 | 23 | 87 |

TABLE 5-continued

| Cross-linker | Mol number of cross-linker | Specific surface area (m²/g) | | | | Bed volume recovery rate (%) | |
|---|---|---|---|---|---|---|---|
| | | 1 | 2 | 3 | 4 | Before cross-linking | After cross-linking |
| | 1.5 | 89.4 | less than 0.01 | 163.5 | 140.0 | 23 | 93 |
| | 2.0 | 89.4 | less than 0.01 | 150.3 | 137.0 | 23 | 90 |

EXAMPLE 4

In the same manner as in Example 3, 50 ml of granular porous chitosan prepared in the basic solution and neutralized with water were subjected to vacuum filtration to remove the water content therein and, thereafter, the water content was completely removed through substitution with a polar solvent in a 100 ml of acetone as the polar solvent as in Example 3. Then, the granular porous chitosan was placed in the solutions containing hexamethylene diisocyanate by 0.3, 0.5, 1.0, and 1.5 mol respectively per one mol of the glucosamine residue used in 100 ml of a polar solvent mixture comprising dimethyl formamide and acetone in 2:1 volume ratio and they were reacted at 30° C. for 1.5 hours under sufficient stirring.

After the completion of the respective reactions, unreacted organic diisocyanate compounds were removed through sufficient washing with a polar mixed solvent comprising dimethyl formamide and acetone in 2:1 volume ratio, followed by water washing. Then, the specific surface area and the bed volume recovery rate were determined in the same manner as in Example 3 and the results are shown in Table 6.

TABLE 6

| Mol number of diisocyanate | Specific surface area (m²/g) | | | | Bed volume recovery rate (%) | |
|---|---|---|---|---|---|---|
| | 1 | 2 | 3 | 4 | Before cross-linking | After cross-linking |
| 0.3 | 89.4 | less than 0.01 | 137.3 | 113.8 | 23 | 71 |
| 0.5 | 89.4 | less than 0.01 | 141.6 | 127.1 | 23 | 73 |
| 1.0 | 89.4 | less than 0.01 | 159.6 | 134.2 | 23 | 82 |
| 1.5 | 89.4 | less than 0.01 | 161.2 | 137.8 | 23 | 91 |

EXAMPLE 5

120 g of chitosan with deacetylation degree of 80% and having an average molecular weight of 11,000 were dissolved in 880 g of water containing 60 g of acetic acid to obtain a chitosan solution of 7,000 cp viscosity, which was poured through a nozzle of 0.25 mm pore size into the basic solution of the same composition as in Example 3 and coagulated to precipitate granular porous chitosan of from 20 to 32 mesh and 97.7 m²/g of specific surface area.

Further, the same procedures as in Example 3 were carried out while using dimethylformamide as a polar solvent and hexamethylene diisocyanate and xylylene diisocyanate as the organic diisocyanate compound at the respective three doses of 0.3, 0.5 and 1.0 mol per one mol of glucosamine residue. The results are shown in Table 7.

TABLE 7

| Crosslinker | Mol number of cross-linker | Specific surface area (m²/g) | | | | Bed volume recovery rate (%) | |
|---|---|---|---|---|---|---|---|
| | | 1 | 2 | 3 | 4 | Before cross-linking | After cross-linking |
| Hexamethylene diisocyanate | 0.3 | 97.7 | less than 0.01 | 65.4 | 58.2 | 31 | 67 |
| | 0.5 | 97.7 | less than 0.01 | 78.1 | 70.3 | 31 | 75 |
| | 1.0 | 97.7 | less than 0.01 | 82.3 | 74.6 | 31 | 82 |
| Xylylene diisocyanate | 0.3 | 97.7 | less than 0.01 | 85.2 | 62.4 | 31 | 72 |
| | 0.5 | 97.7 | less than 0.01 | 85.6 | 66.3 | 31 | 79 |
| | 1.0 | 97.7 | less than 0.01 | 89.7 | 72.1 | 31 | 82 |

EXAMPLE 6

40 g of chitosan with deacetylation degree of 80% and having an average molecular weight of 66,000 were dissolved in 960 g of water containing 20 g of acetic acid to obtain a chitosan solution of 2800 cp·viscosity, which was poured through a nozzle of 0.25 mm pore size into the basic solution of the same composition as in Example 3 and coagulated to precipitate granular porous chitosan of from 20 to 32 mesh and 82.3 m²/g of specific surface area.

The same procedures as in Example 3 were carried out with hexamethylene diisocyanate as the organic diisocyanate and acetone as the polar solvent. The results are shown in Table 8.

TABLE 8

| Mol number of hexamethylene diisocyanate | Specific surface area (m²/g) | | | | Bed volume recovery rate (%) | |
|---|---|---|---|---|---|---|
| | 1 | 2 | 3 | 4 | Before cross-linking | After cross-linking |
| 0.2 | 82.3 | less than 0.01 | 82.6 | 64.9 | 15 | 56 |
| 1.0 | 82.3 | less than 0.01 | 99.5 | 70.3 | 15 | 61 |
| 2.0 | 82.3 | less than 0.01 | 117.2 | 72.1 | 15 | 81 |

EXAMPLE 7

60 g of chitosan with deacetylation degree of 80% and having an average molecular weight of 47,000 were dissolved in 910 g of water containing 30 g of acetic acid to obtain a chitosan solution of 10,000 cp viscosity, which was poured through a nozzle of 0.25 mm pore size into the basic solution comprising 10% sodium hydroxide, 30% methanol and 60% water, coagulated to precipitate and washed sufficiently with water for neutralization to obtain granular porous chitosan of from 32 to 42 mesh and 83.2 m$^2$/g of specific surface area.

After applying vacuum filtration to 50 ml of the granular porous chitosan (volume as precipitated, dry weight 2.73 g) to remove the water contained therein, they were placed in a porous solvent of 100 ml of dimethylformamide to completely substitute the water content with the polar solvent by repeating the water replacing procedure under stirring.

The thus treated chitosan was reacted at 60° C. for 2.5 hours in a solvent of 100 ml of dimethyl formamide containing 2 mol of hexamethylene diisocyanate per one mol of the glucosamine residue and at 60° C. for 4 hours in a solvent containing 2 mol of xylylene diisocyanate. Then, the respective unreacted organic diisocyanate compounds were sufficiently washed out with dimethyl formamide and the products then sufficiently washed with water to obtain granular porous chitosan. The results are shown in Table 9.

TABLE 9

| Crosslinker | Specific surface area (m$^2$/g) | | | | Bed volume recovery rate (%) | |
|---|---|---|---|---|---|---|
| | 1 | 2 | 3 | 4 | Before cross-linking | After cross-linking |
| Hexamethylene diisocyanate | 83.2 | less than 0.01 | 158.6 | 136.1 | 21 | 91 |
| Xylylene diisocyanate | 83.2 | less than 0.01 | 159.1 | 139.8 | 21 | 92 |

EXAMPLE 8

60 g of chitosan with deacetylation degree of 80% and having an average molecular weight of 46,000 were dissolved in 940 g of water containing 30 g of formic acid to obtain a solution of 2,800 cp viscosity, which was poured into the basic solution comprising 10% sodium hydroxide, 30% methanol and 60% water through a nozzle of 0.25 mm pore size so as to form a spherical shape, coagulated to precipitate and then sufficiently washed with water for neutralization to obtain granular porous chitosan of from 20 to 32 mesh and 77.0 m$^2$/g of specific surface area.

Further, after applying vacuum filtration to 50 ml of the granular porous chitosan containing water, (volume as settled, dry weight 2.73 g) to remove the water contained therein, they were placed in a polar solvent of 100 ml of acetone to completely substitute the water content with the polar solvent by repeating the water replacing procedures under stirring. The granular porous chitosan with water completely removed was reacted at 30° C. for 1.5 hours under sufficient stirring in solutions prepared so as to contain 1.5 mol of hexamethylene diisocyanate or 1.5 mol of xylylene diisocyanate per one mol of the glucosamine residue of chitosan used in 100 ml of acetone. After the reaction was over unreacted organic diisocyanate compounds were sufficiently washed out with acetone and the product then washed with water to obtain granular porous chitosan.

The thus obtained granular porous chitosan was dried and measured as described in Example 3. The results are shown in Table 10.

TABLE 10

| Crosslinker | Specific surface area (m$^2$/g) | | | | Bed volume recovery rate (%) | |
|---|---|---|---|---|---|---|
| | 1 | 2 | 3 | 4 | Before cross-linking | After cross-linking |
| Hexamethylene diisocyanate | 77.0 | less than 0.01 | 139.8 | 130.6 | 27 | 93 |
| Xylylene diisocyanate | 77.0 | less than 0.01 | 148.3 | 132.5 | 27 | 92 |

EXAMPLE 9

40 g of chitosan with deacetylation degree of 80% and having an average molecular weight of 81,000 were dissolved in 960 g of water containing 20 g of dichloroacetic acid to obtain a solution of 2,800 cp viscosity, which was poured through a nozzle of 0.25 mm pore size into the basic solution comprising 1% ethylenediamine and 99% methanol, coagulated to precipitate, sufficiently washed with water for neutralization to obtain granular porous chitosan of from 32 to 42 mesh and 88.6 m$^2$/g of specific surface area.

50 ml of the granular porous chitosan (volume as precipitated dry weight 1.98 g) was reacted with the organic diisocyanate compound in the same procedures as described in Example 6. The results are shown in Table 11. The amounts of the diisocyanate compounds used were 1.0 mol respectively.

TABLE 11

| Crosslinker | Specific surface area (m$^2$/g) | | | | Bed volume recovery rate (%) | |
|---|---|---|---|---|---|---|
| | 1 | 2 | 3 | 4 | Before cross-linking | After cross-linking |
| Hexamethylene diisocyanate | 88.6 | less than 0.01 | 115.4 | 88.5 | 15 | 90 |
| Xylylene diisocyanate | 88.6 | less than 0.01 | 152.1 | 150.7 | 15 | 84 |

As described above, the granular porous chitosan produced according to this invention is highly chemically reactive since it has an excellent surface activity and an increased specific surface area. The particle size obtained is larger than with conventional granular materials of extremely low particle size so that, when they are filled as the carrier in a vessel, they exhibit large surface area and do not hinder the flow of the fluid. Furthermore, since the granular chitosan thus obtained has a high strength, it is less destructible and can be used in various field of use.

Further, upon practicing this invention, desired granular porous chitosan can be obtained by appropriately selecting the concentration of the acidic solution of the chitosan, the combination and the concentration of the basic solution as the coagulating bath composition. Since the number of chemicals used is decreased as compared with the conventional processes, there is no trouble with the recovery of the solvent since no other ingredients are used.

Furthermore, as apparent from the measured values for the specific surface area and the bed volume recovery rate in the above-mentioned examples, since the granular porous chitosan crosslinked with the organic diisocyanate compound can substantially recover volume and porosity as in the water-containing state before drying, even when immersed again in the aqueous system after ordinary drying or freeze drying, it is convenient for storage and transportation.

In addition, since the granular porous chitosan subjected to the crosslinking treatment in accordance with this invention shows no dissolution, swelling, discoloration or other like changes against acid and alkali and has an increased strength, it is suitable for use as a chromatographic filler, carrier for immobilized biocatalyst, etc. Further, the granular porous chitosan according to this invention does not deform when packed in a column or the like and does not increase the liquid flow resistance therein. Furthermore, ion exchanging performance to anions can be improved through the application of crosslinking.

What is claimed is:

1. A process for producing granular porous chitosan, which comprises dissolving a chitosan having a mean molecular weight of 10,000 to 230,000 in an amount of from 2 to 20% by weight into an aqueous acidic solution, thereby forming an intermediate solution consisting essentially of said chitosan and said aqueous acidic solution; and pouring said intermediate solution into a basic solution to precipitate porous chitosan having a specific surface area of 15 to 98 $m^2/g$.

2. The process according to claim 1, wherein the basic solution comprises a base and water; a base, water and an alcohol; or a base and an alcohol.

3. The process according to claim 2, wherein the basic solution is selected from the group consisting of NaOH-water system, NaOH-alcohol-water system, ethylenediamine-alcohol system, ammonia-water system and ammonia-alcohol-water system.

4. The process according to claim 1, further comprising reacting said porous chitosan with an organic diisocyanate in an amount of 0.2 to 2.0 moles per mole of glucosamine residue of said porous chitosan in a polar solvent to provide a product having a bed volume recovery rate of 56 to 98%.

5. The process according to claim 4, wherein the organic diisocyanate is selected from the group consisting of 4,4'-diphenylmethane diisocyanate, 1,4-phenylene diisocyanate, 2,4-tolylene diisocyanate, naphthalene diisocyanate, 1,4-cyclohexane diisocyanate, 4,4'-dicyclohexylmethane diisocyanate, xylylene diisocyanate, isophorone diisocyanate and hexamethylene diisocyanate.

6. The process according to claim 5, wherein the organic diisocyanate is hexamethylene diisocyanate, xylylene diisocyante or 4,4'-diphenylmethane diisocyanate.

7. A granular porous chitosan prepared by a process which comprises:
dissolving a chitosan having a mean molecular weight of 10,000 to 230,000 in an amount of from 2 to 20% by weight into an aqueous acidic solution, thereby forming an intermediate solution consisting essentially of said chitosan and said aqueous acidic solution;
pouring said intermediate solution into a basic solution to precipitate porous chitosan having a specific surface area of 15 to 98 $m^2/g$; and
reacting said porous chitosan with an organic diisocyanate in an amount of 0.2 to 2.0 moles per mole of glucosamine residue of said porous chitosan in a polar solvent to provide a product having a bed volume recovery rate of 56 to 98%

8. A granular porous chitosan according to claim 7 wherein the basic solution comprises a base and water; a base, water and an alcohol; or a base and an alcohol.

9. A granular porous chitosan according to claim 8, wherein the basic solution is selected from the group consisting of NaOH-water system, NaOH-alcohol-water system, ethylenediamine-alcohol system, ammonia-water system and ammonia-alcohol-water system.

10. A granular porous chitosan according to claim 4, wherein the organic diisocyanate is selected from the group consisting of 4,4'-diphenylmethane diisocyanate, 1,4-phenylene diisocyanate, 2,4-tolylene diisocyanate, naphthalene diisocyanate, 1,4-cyclohexane diisocyanate, 4,4'-dicyclohexylmethane diisocyanate, xylylene diisocyanate, isophorone diisocyanate and hexamethylene diisocyanate.

11. A granular porous chitosan according to claim 10, wherein the organic diisocyanate is hexamethylene diisocyanate, xylylene diisocyanate or 4,4'-diphenylmethane diisocyanate.

* * * * *